(No Model.)
C. F. SMITH.
EGG BEATER.
No. 588,663. Patented Aug. 24, 1897.
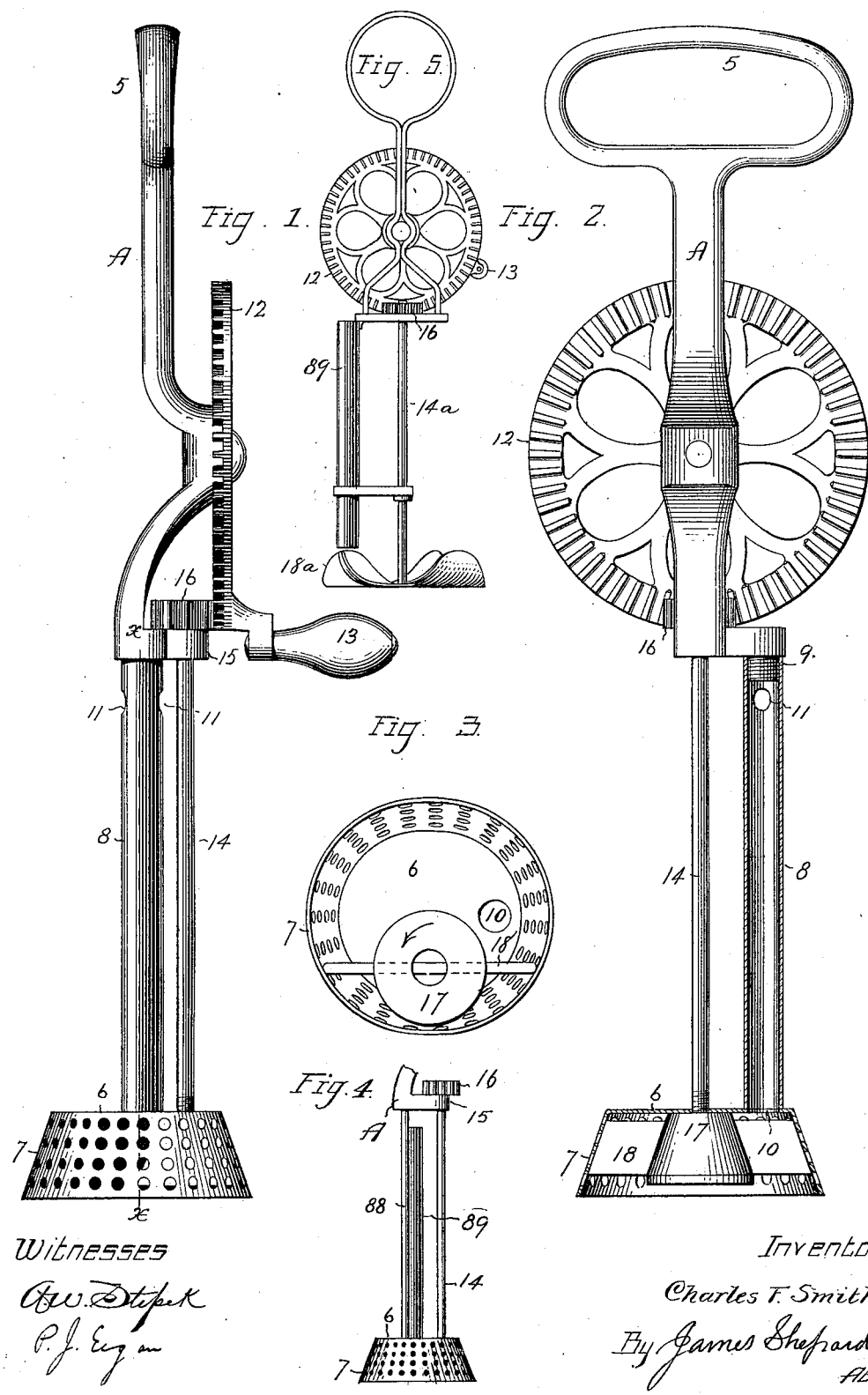
Witnesses
Inventor
Charles F. Smith,
By James Shepard.
Atty

UNITED STATES PATENT OFFICE.

CHARLES F. SMITH, OF NEW BRITAIN, CONNECTICUT, ASSIGNOR TO THE LANDERS, FRARY & CLARK, OF SAME PLACE.

EGG-BEATER.

SPECIFICATION forming part of Letters Patent No. 588,663, dated August 24, 1897.

Application filed December 7, 1896. Serial No. 614,831. (No model.)

*To all whom it may concern:*

Be it known that I, CHARLES F. SMITH, a citizen of the United States, residing at New Britain, in the county of Hartford and State of Connecticut, have invented certain new and useful Improvements in Egg-Beaters, of which the following is a specification.

My invention relates to improvements in egg-beaters; and the object of my improvement is to provide for a supply of air to the agitator.

In the accompanying drawings, Figure 1 is a front elevation of my egg-beater. Fig. 2 is a side elevation of the same with some of the parts in vertical section on the line $x$ $x$ of Fig. 1. Fig. 3 is a view of the lower end of my egg-beater from the under side. Fig. 4 is a side elevation of the lower portion of my egg-beater in a modified form, and Fig. 5 is an elevation showing another modification.

A designates the frame, provided at its upper end with a suitable handle 5. A cover-plate 6 and perforated skirt 7 is supported from the lower end of said frame by a suitable standard made rigid therewith. In the preferred construction this standard is formed by the air-supply tube 8, the upper end of which is screwed upon the threaded boss 9, Fig. 2, of the frame, and is soldered or otherwise secured to the cover-plate 6 at its lower end, the said cover-plate being perforated, as at 10, to communicate with said tube, while the upper end of said supply-tube is perforated, as at 11, for the introduction of air from without. A driving gear-wheel 12 is mounted on the frame A and provided with a handle or crank 13. A shaft 14 has its bearing in the arm 15 of the frame A and is provided with a pinion 16 in engagement with the gear-wheel 12. The lower end of said shaft 14 carries a transversely-slotted head 17, that lies closely to the perforated skirt 7 at one side and carries within its slot a sliding blade or float 18. The skirt, revolving head, and blade 18 are so related to each other that the ends of the blade wipe the skirt in their revolution and the blade is forced endwise back and forth within the slotted head, while said head is so near to the skirt that when revolved in the direction indicated by the dart in Fig. 3 the egg or other substance operated upon is confined between the forward end of the blade and the head as said end moves toward said head and forced out through the perforations in the skirt, while at the same time the advance end of the blade on the other side of said head is forcing the material away from the space inclosed between it and the head, thereby creating a draft to draw the material in through the perforated skirt, and after the blade passes the perforation 10 in the cover-plate a fresh supply of air is drawn in through said perforation from the air-supply tube 8.

If desired, the supporting-standard for the cover-plate and skirt may be formed separately from the air-supply tube by making it solid, as at 88, Fig. 4, while the air-supply tube 89 extends upward from the cover-plate in the same position as shown in Figs. 1, 2, and 3, and is left open at its upper end, but disconnected from the frame, as shown in Fig. 4.

A cover-plate, perforated skirt, rotating and transversely-slotted head carrying a sliding blade are not by themselves of my invention, and other agitating mechanism may be substituted underneath a cover-plate for the head and blade herein shown. While I prefer to employ a cover-plate over the agitator, as before described, it is not necessary so to do, as the air will be drawn down into the mass from the tube extending down near to the agitator without a cover-plate. In Fig. 5 I show such a construction, in which 18$^a$ designates the agitator, mounted on the shaft 14$^a$ and driven in any proper manner, while the air-supply tube 89 is supported on the frame and extends down near to the plane in which the upper portion of the agitator revolves.

By my invention the egg is very rapidly and efficiently aerated, so that the beating is accomplished in the shortest possible time no matter how much material be operated upon.

I am aware that prior patents describe air-tubes concentrically mounted to revolve within churns in connection with special air-drawing wheels and air-chambers into which the said tubes discharge, also a dasher-churn with a fixed tube at one side leading into a chamber underneath a false bottom in the churn, said bottom being provided with a valved opening through which air is forced into the churn by means of a special pump, and the same are hereby disclaimed.

It will be noticed that in both of the constructions of mine the tube is fixed with its effluent end arranged adjacent to the moving blades of the rotary agitator, so that the mass being agitated is drawn past the end of said tube. In both constructions of mine the ordinary rotary agitator moving past the end of the tube acts to draw air in through the tube, whereby I dispense with the special air wheels or pumps and special air-chambers heretofore supposed to be necessary.

I wish it distinctly understood that I do not limit myself to the particular construction of the air-supply tube, nor of the other parts, but desire to cover all such changes therefrom as may fairly fall within the spirit and scope of my invention.

I claim as my invention—

1. In an egg-beater, the combination of a fixed cover-plate, with a rotary agitator underneath said plate and an upwardly-extended air-supply tube, having its effluent end opening underneath said plate and fixed relatively to the agitator-blades so that the latter are moved past the lower end of said tube, substantially as described.

2. In an egg-beater, the combination of a fixed air-supply tube with a rotary agitator, the effluent end of said tube being arranged closely to the moving blades of the agitator in relative position thereto for having said blades move past the said end, substantially as described.

3. In an egg-beater, the combination of a rotary agitator and a fixed air-tube, located closely to said agitator directly over the path described by the outer portion of the agitator-blades, substantially as described.

CHARLES F. SMITH.

Witnesses:
O. N. JUDD,
JOHN J. NEENAN.